United States Patent [19]

Harris

[11] Patent Number: 4,736,863

[45] Date of Patent: Apr. 12, 1988

[54] BALL-VALVE FUEL CAP

[75] Inventor: Robert S. Harris, Connersville, Ind.

[73] Assignee: Stant Inc., Connersville, Ind.

[21] Appl. No.: 868,551

[22] Filed: May 30, 1986

[51] Int. Cl.[4] .............................................. F16K 17/36
[52] U.S. Cl. .................................... 220/203; 220/367;
220/DIG. 33; 137/533.11
[58] Field of Search ............... 220/203, 205, 367, 373,
220/DIG. 32, DIG. 33; 137/43, 512.2, 512.3,
533.11

[56] References Cited

U.S. PATENT DOCUMENTS

| | | | |
|---|---|---|---|
| 3,164,288 | 1/1965 | Boomgaard | 220/203 |
| 3,938,692 | 2/1976 | Crute | 220/203 |
| 3,985,260 | 10/1976 | Evans | 220/203 |
| 4,000,828 | 1/1977 | Crute et al. | |
| 4,049,152 | 9/1977 | Treanor | 220/367 X |
| 4,162,021 | 7/1979 | Crute | 220/303 X |
| 4,457,325 | 7/1984 | Green | 220/203 X |

Primary Examiner—Steven M. Pollard

Attorney, Agent, or Firm—Barnes & Thornburg

[57] ABSTRACT

A cap for closing the filler neck of a vehicle fuel tank is provided. The cap includes a valve body having an upper opening and movable between a normal lower position and an upper position. The valve body includes a ball disposed therein to seal the upper opening when the cap and filler neck are rolled over to a substantially inverted position and vent openings in the side wall that are located somewhat above the level of the ball when the cap and filler neck are substantially upright. When the valve body is in the normal lower position, fuel vapor is allowed to vent to the atmosphere through the vent openings and upper opening in the valve body. If the ball is upwardly and seals the upper opening prematurely, the fuel vapor will form the valve body to the upper position to allow the fuel vapor to continue to vent to the atmosphere around the valve body. In another embodiment of the invention, the cap may include an axially movable plunger to allow the ball to be manually displaced in the event the ball prematurely seals the upper opening.

3 Claims, 2 Drawing Sheets

BALL-VALVE FUEL CAP

The present invention relates to a vented fuel cap for a vehicle having an increased venting capacity and including a roll-over safety feature. More particularly, the present invention relates to a vented fuel cap that combines a roll-over safety feature with an increased venting capacity and means for excess fuel vapor to bypass the primary vent means should the vent means become prematurely blocked by the roll-over safety feature.

Vehicles, and particularly off-road vehicles, such as tractors and the like, generally have fuel tanks mounted such that the filler necks of the fuel tanks extend vertically upwardly from the tank. Generally, the fuel tank is located directly beneath the filler neck, under the hood of the vehicle. Because such vehicles normally have large fuel tanks, and normally operate on rough surfaces, such as agricultural fields, these vehicles are more susceptible to generating fuel vapor than normal vehicles. Also such vehicles are more susceptible to roll-over than normal vehicles because of the surfaces usually traversed.

It is therefore desirable to provide such vehicles with a fuel cap that is able to allow the fuel tank to vent fuel vapor to the atmosphere during normal operation. It is also desirable for the cap to seal the vent if the vehicle should roll over to prevent fuel from pouring out from the vents in the cap onto the ground. In addition, it is also desirable to provide a bypass vent to allow excess fuel vapor to continue venting to the atmosphere in case the roll-over safety feature should prematurely seal the primary vent in the cap.

The prior art discloses many different types of roll-over fuel caps for use in the filler necks of vehicle fuel tanks. One problem with the prior art caps is that such caps generally are not able to provide adequate venting capability under conditions where a large amount of fuel vapor may be formed.

Another problem with the prior art caps, and especially prior art caps that have attempted to increase the venting capacity as well as provide a roll-over safety feature, is that the roll-over safety feature may be prematurely forced to seal the primary vent due to excess fuel vapor being forced through the primary vent. Such a sealing of the primary venting capacity of the cap can cause the fuel vapor to build up within the fuel tank, with undesirable consequences resulting.

One object of the present invention is to provide a fuel cap with increased venting capacity.

Another object of the present invention is to provide a fuel cap having increased venting capacity and including a roll-over safety feature, with the vent openings placed to minimize the chances that the roll-over safety feature will be forced to seal the primary vent prematurely.

Yet another object of the present invention is to provide a fuel cap with a bypass venting means to allow excess fuel vapor to vent to the atmosphere should the primary vent means become closed prematurely by the roll-over safety feature.

Yet another object of the present invention is to provide a fuel cap having the provision to manually displace the roll-over safety feature should it become stuck prematurely in the primary vent.

According to the present invention, a cap for closing the filler neck of a vehicle fuel tank containing fuel is provided. The cap includes a cover having an opening formed therethrough and a concentric housing having a first central opening formed therethrough, the housing extending axially downwardly into the filler neck and connected with the cover such that the first opening is in communication with the cover opening. The cap also includes a valve body partially disposed within the housing and axially movable between a normal lower position and an upper position that extends axially downwardly into the filler neck. The cap further includes first means providing a normally open vent between the fuel tank and the first central opening in the housing and second means providing a vent between the fuel tank and the first central opening in the housing when the pressure in the tank reaches a specified superatmospheric level. The cap further includes means disposed within the valve body to seal the first vent means when the filler neck and cap are rolled over to a substantially inverted orientation.

One feature of the foregoing structure is that a second vent means is provided between the fuel tank and the first central opening in the housing to allow fuel vapor to vent to the atmosphere should the primary or first vent means become disabled by the roll-over safety feature prematurely. One advantage of this feature is that excess fuel vapor is not allowed to build up within the fuel tank.

In preferred embodiments of the present invention, the first vent means comprises a side wall of the valve body formed to include a plurality of holes and a second central opening formed in an upper portion of the valve body.

Also in preferred embodiments of the present invention, the upper portion of the valve body includes a radially outwardly extending shoulder and the housing includes a radially inwardly extending, axially upwardly facing sealing surface that normally supports the shoulder and the second vent means comprises a space formed between the shoulder and the sealing surface when the valve body is in the upper position. One feature of the foregoing structure is that the valve body axially moves to create the second vent means. One advantage of this feature is that as excess pressure builds within the fuel tank if the first vent means is prematurely blocked by the roll-over safety feature, the excess pressure will bear against the valve body forcing the valve body to move axially to create the second vent means to release this excess fuel pressure.

Also in preferred embodiments of the present invention, the plurality of holes formed in the side wall of the valve body are formed above the normal level of the roll-over safety feature. One feature of the foregoing structure is that fuel vapor flowing through the holes into the valve body enters the valve body above the level of the roll-over safety feature. One advantage of this feature is that the inflowing fuel vapor is less likely to force the roll-over safety feature axially upwardly to prematurely seal the first vent means.

Also in preferred embodiments of the present invention, the first vent means further comprises at least one additional opening formed in the concentric housing, the at least one additional opening being radially displaced from the first central opening in the housing. One feature of the foregoing structure is that additional openings are provided to allow fuel vapor to exit the cap to the atmosphere. One advantage of this feature is that the cap provides an increased venting capacity over caps without this feature.

In another embodiment of the present invention, the valve body is not adapted to move within the cap. However, means are provided for displacing the sealing means from the first vent means should the sealing means be forced upwardly by the fuel vapor to prematurely seal the first vent means. One feature of the foregoing structure is that the sealing means can be manually repositioned away from the first vent means in the event that the sealing means prematurely seals the first vent means. One advantage of this feature is that the operator of the vehicle can manually displace the sealing means to prevent excess fuel vapor from building up within the fuel tank.

Additional objects, features, and advantages of the invention will become apparent to those skilled in the art upon consideration of the following detailed description of preferred embodiments exemplifying the best modes of carrying out the invention as presently perceived. The detailed description particularly refers to the accompanying figures in which.

Figure 1:
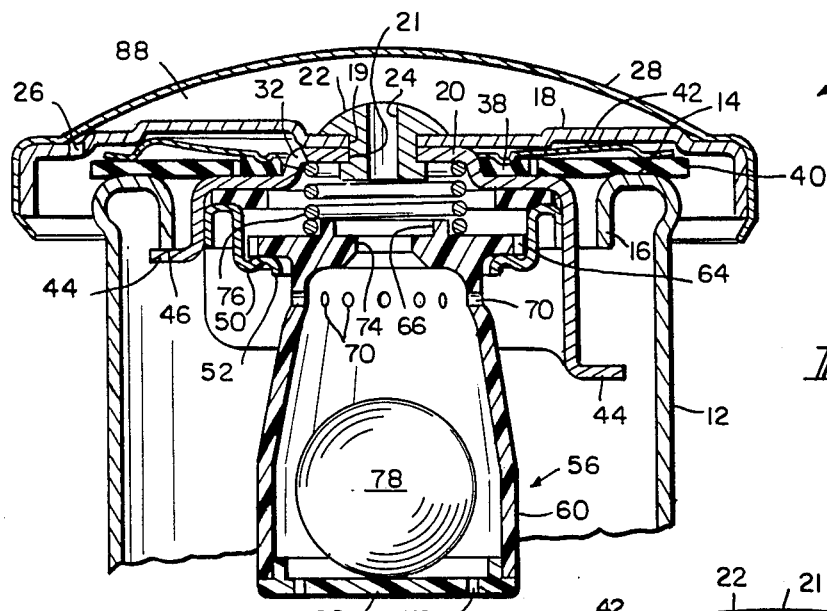
FIG. 1 is a transverse sectional view through the cap and filler neck with the sealing ball in the normal lower position.
Figure 3:
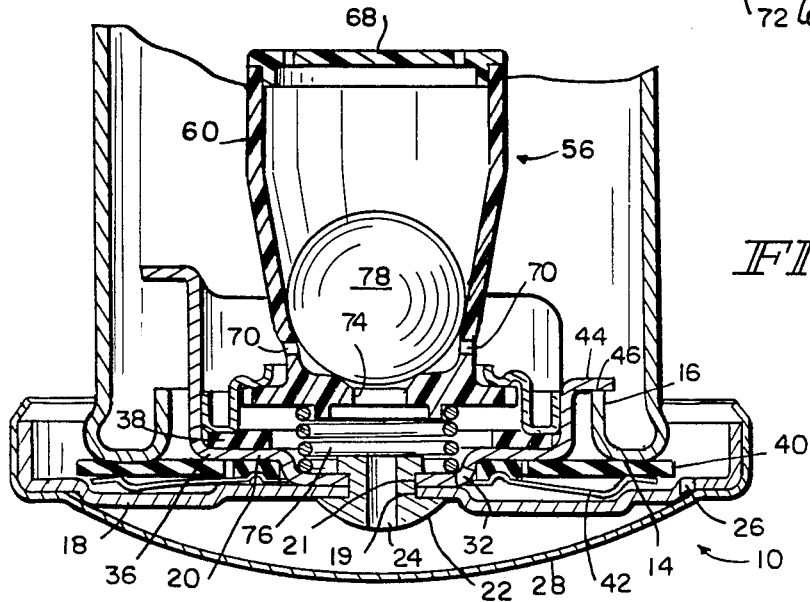
FIG. 3 is a view similar to FIG. 1 with the cap and filler neck in a substantially inverted position.

Referring now to the drawings, and particularly to FIG. 1, a fuel cap 10 is shown for closing a filler neck 12 of a fuel tank (not shown) containing fuel 84 (FIG. 3). The filler neck 12 is of the type having a peripherally and radially extending, upwardly facing sealing surface 14 concentric with the axis of the neck 12 and, at the radially inner edge of the sealing surface 14, a downwardly turned, peripherally extending flange 16 which has a cam profile edge which will be discussed later. The cap 10 includes a cover 18 with an opening 19 formed therethrough. A housing 20 having a first opening 21 formed therethrough is rigidly fastened to the cover 18 by a concentric rivet 22 which extends through the opening 19 and the first opening 21. The housing 20 is a downwardly opening, generally concentric cup. The rivet 22 is formed to include a centrally disposed, axially extending aperture 24 therethrough. The cover 18 also includes an opening 26 near its peripheral outer edge, the purpose of which will be discussed later. The housing 20 also includes additional openings 32 spaced radially outwardly from the first opening 21. Illustratively, there are five additional openings 32 in the housing 20.

A decorative cover 28 is disposed over the cover 18, and connected to the cover 18 by a turned-in portion 30. The housing 20 includes an upper shoulder 36 spaced axially apart from the cover 18 to define a space therebetween to receive an inner gasket 38, an outer gasket 40, and a diaphragm spring 42. The outer gasket 40 bears against both the shoulder 36 of the housing 20 and the sealing surface 14 of the filler neck 12 to provide a seal between the housing 20 and the filler neck 12.

Both of the gaskets 38, 40 may be synthetic rubber gaskets, and the diaphragm spring 42 may be a stainless steel diaphragm spring for yieldably urging the outer peripheral edge of the outer gasket 40 axially downwardly to contact the sealing surface 14.

The housing 20 is formed with radially outwardly extending ears 44 which conventionally pass downwardly through notches (not shown) in the sealing surface 14 and the flange 16 of the filler neck 12 to engage a cam locking surface 46 defined by the distal edge of the flange 16. Twisting of the decorative cover 28 conventionally rotates the fuel cap 10 to move the housing 20 axially downwardly to press the outer gasket 40 against the sealing surface 14. A retainer 50 is disposed within the housing 20 and includes an upper surface 51 which captures a gasket 54 between itself and the axially downwardly facing surface of the shoulder 36 of the housing 20. The retainer 50 also includes an axially upwardly facing, concentric support surface 52.

A valve body 56 is also disposed within the housing 20. The valve body 56 includes a top wall 62 having a peripherally extending, axially downwardly facing shoulder 64. The support surface 52 of the retainer 50 is sized to contact and support the shoulder 64 to retain the valve body within the housing 20. The valve body 56 also includes a side wall 60 that extends axially downwardly and radially outwardly from the top wall 62. Thus, the valve body 56 is tapered slightly from the top wall 62 to a bottom wall 68. A circular ridge 66 extends upwardly from the top wall 62 to capture a spring 76 between the top wall 62 and the housing 20. The spring 76 acts to yieldably urge the valve body 56 to an axially lower position where the valve body 56, and specifically the shoulder 62, is in contact with the support surface 52 of the retainer 50.

A series of holes 70 are formed in the side wall 60 substantially near the top wall 62 of the valve body 56. The holes 70 are formed to allow fuel vapor (not shown) to enter the valve body 56 to allow the fuel vapor to vent to the atmosphere. Illustratively, there are twelve holes 70 substantially equally spaced around the side wall 60. In addition to the holes 70, drain holes 72 are formed in the bottom wall 68 of the valve body 56. The drain holes 72 are formed primarily to allow any fuel that enters the valve body 56 to drain back into the fuel tank. A concentric second opening 74 is formed in the top wall 82 of the valve body 56 to allow fuel vapor that enters the valve body 56 to communicate with the aperture 24 in the rivet 22 to be vented to the atmosphere through the peripheral opening 26. A ball 78 is disposed within the valve body 56, the ball 78 having a density greater than the density of the fuel in the fuel tank. The ball 78 is sized to seal the second opening 74 in the top wall 62 of the valve body 56 when the filler neck 12 and fuel cap 10 are in a substantially inverted position (FIG. 3). Illustratively, the ball 78 is formed from steel, however it is understood that other materials would be equally suitable.

Figure 2:
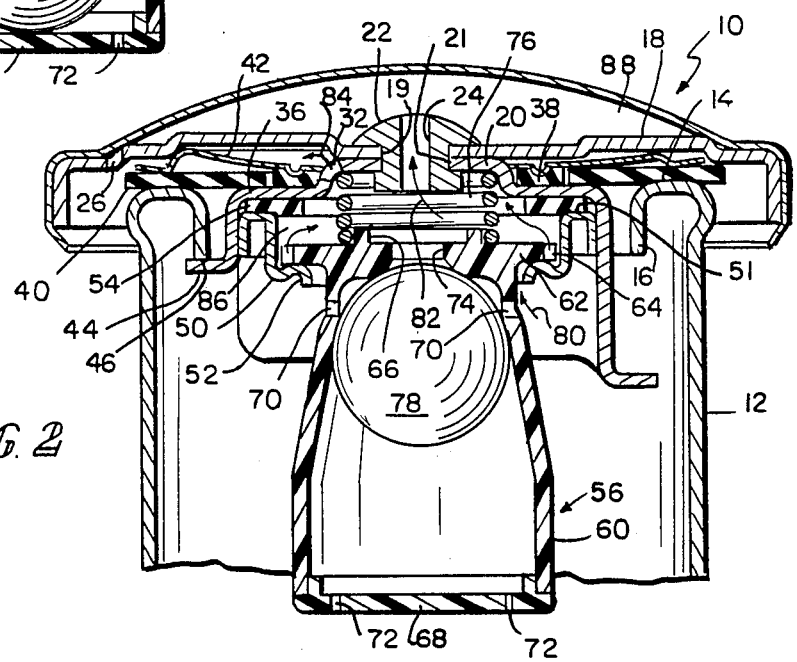
FIG. 2 is a view similar to FIG. 1 with the sealing ball in the upper position with the valve body forced slightly axially upwardly to allow fuel vapor to vent around the valve body.

Referring now to FIG. 2, FIG. 2 shows the ball 78 in a position prematurely sealing the second opening 74 to block the venting capability of the cap 10. One possible cause of the ball 78 being stuck in this upper position could be that the vehicle has been subjected to a bump which has momentarily forced the ball 78 axially upwardly to this position. Then, if excess fuel pressure is present in the fuel tank, this fuel vapor could potentially hold the ball 78 in this position. If the fuel vapor in the fuel tank reaches a specified superatmospheric pressure, the downward pressure imposed on the valve body 56 by the spring 76 will be overcome and the valve body 56 will move axially upwardly away from the support surface 52 to create a space 86 between the shoulder 64 of the valve body and the support surface 52 of the retainer 50. The fuel vapor can then escape from the fuel tank as indicated by arrows 80 to a position above the valve body 56. This fuel vapor may then exit through the aperture 24 in the rivet 22, as indicated by arrow 82. The fuel vapor can also exit through the additional openings 32 in the housing 20, as indicated by arrow 84. Thus, the fuel vapor is allowed to vent to the atmosphere to relieve the excess pressure in the fuel tank. The fuel vapor exiting through the aperture 24 then enters a space 88 formed between the decorative cover 28 and the cover 18. This fuel vapor then passes through the peripheral opening 26 to the atmosphere.

Referring now to FIG. 3, FIG. 3 shows the fuel cap 10 and filler neck 12 when the vehicle has rolled over to a substantially inverted orientation. The fuel in the fuel tank is prevented from flowing through the second opening 74 in the valve body 56 by the ball 78. Thus, the ball 78 prevents the fuel from flowing from the fuel tank onto the ground.

Figure 4:
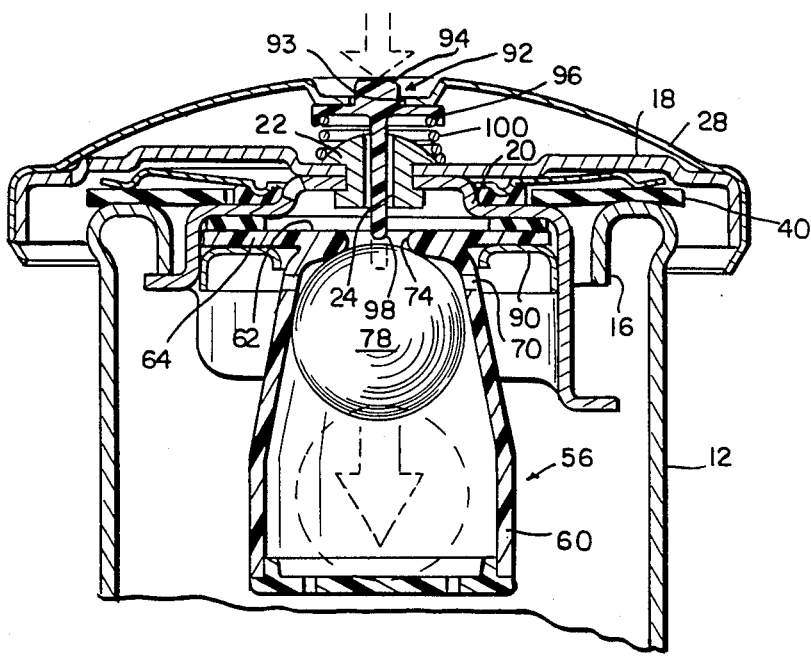
FIG. 4 is a transverse sectional view through the cap and filler neck showing a fuel cap according to another embodiment of the present invention.

Referring now to FIG. 4, FIG. 4 shows another embodiment of the present invention in which the valve body 56 is not movable as in the embodiment shown in FIGS. 1-3. A retainer 90 is disposed within the housing 20 to support the shoulder 64 of the valve body 56. A plunger 92 extends through a hole 93 in the decorative cover 28. The plunger 92 includes a button 94 that extends outwardly through the hole 93. The plunger 92 also includes a radially outwardly extending shoulder 96 which captures a spring 100 between itself and the upper surface of the cover 18. The spring 100 yieldably urges the plunger 92 to an axially upper position. A finger 98 extends axially downwardly from the flange shoulder 96 through the aperture 24 in the rivet 22 to a position slightly above the second opening 74 in the top wall 62 of the valve body 56. When the button 94 is manually depressed by an operator, the finger 98 is forced to extend through the second opening 74. In the instance where the ball 78 has been forced to prematurely seal the second opening 74, thereby trapping fuel vapor within the fuel tank, the operator can depress the button 94 to extend the finger 98 into the second opening 74 to manually displace the ball 78 away from the second opening 74. This will cause the ball 78 to fall to the bottom of the valve body 56, its normal lower position.

In operation, the cap 10 is installed in the filler neck 12 of a vehicle in a known manner so that the ears 44 engage the cam locking surface 46 of the filler neck 12. The outer gasket 40, which is biased axially downwardly by the diaphragm spring 42, contacts the sealing surface 14 of the filler neck 12 to effect a seal between the cap 10 and the filler neck 12.

Referring now to FIG. 1, which shows the cap 10 and the filler neck 12 in a normal, upright position, it is desirable to let the vapor from the fuel in the fuel tank (not shown) continuously vent to the atmosphere. This venting of the fuel vapor from the fuel tank to the atmosphere is provided by the first venting means which comprises the holes 70 in the valve body 56, the second opening 74 in the top wall 62, the aperture 24 in the rivet 22 in combination with the peripheral opening 26 in the cover 18, and the additional openings 32 in the housing 20.

As discussed previously, the holes 70 in the side wall 60 of the valve body 56 are located to force any vapor entering the valve body 56 to enter at a level somewhat above the ball 78. This orientation is designed to prevent the incoming vapor from forcing the ball 78 upwardly to prematurely seal the second opening 74 in the top wall 62 to effectively shut off the first venting means.

In case the ball 78 is somehow forced upwardly to seal the second opening 74, then the valve body 56 will be forced axially upwardly to open the second vent means which comprises the space 86 between the support surface 52 and the shoulder 64 (FIG. 2). The fuel vapor then exits through this space as indicated by arrows 80 in FIG. 2. The fuel vapor then continues both through the aperture 24 (as indicated by arrow 82) and through the additional openings 32 (as indicated by arrow 84). Thus, the fuel vapor in the fuel tank is allowed to vent to the atmosphere even though the ball 78 has prematurely sealed the first vent means.

Referring now to FIG. 4, another embodiment of the present invention, if the ball 78 is forced upwardly to prematurely seal the second opening 74 to seal the venting capability of the cap 10, the operator may simply depress the plunger 92 to cause the finger 98 to displace the ball 78 from the second opening 74. The ball 78 then falls by gravity to its normal lower position to open again the venting capability of the cap.

As can be seen from the above discussion, the cap 10 of the present invention provides increased fuel vapor venting capability and alleviates potential problems caused by premature sealing of this venting capability. The inclusion of the movable valve body 56 greatly reduces the chance that fuel vapor will build up within the fuel tank to an excessively high level. The high location of the holes 70 in the valve body 56 greatly reduces the chance that fuel vapor will force the ball 78 upwardly to prematurely seal the second opening 74. In addition to these features, the cap 10 is also configured to seal the second opening 74 when the vehicle is rolled to a substantially inverted position.

Although the invention has been described in detail with reference to preferred embodiments and specific examples, variations and modifications exist within the scope and spirit of the invention as described and defined in the following claims.

What is claimed is:

1. A cap for closing the filler neck of a vehicle fuel tank, the fuel tank having a normally upwardly extending filler neck with a peripherally and radially extending, upwardly facing sealing surface concentric with the longitudinal axis of the neck, the cap comprising:
   a cover having an opening formed therethrough;
   a concentric housing having a first central opening formed therethrough, said housing extending downwardly into said filler neck and connected with said cover such that said first central opening is in communication with said cover opening;
   an elongated valve body partially disposed within said housing and extending downwardly into said filler neck, the valve body formed to include a plurality of first vent holes spaced around an upper portion thereof, the first vent holes having a first diameter and providing venting communication between the valve body chamber and the fuel tank, the valve body also formed to include a second vent hole in the upper portion of the valve body, the second vent hole providing venting communication between the valve body chamber and the housing opening;

a ball disposed within the valve body chamber in a lower portion of the valve body below the first vent opening for sealing the second vent hole when the filler neck and cap are in a substantially inverted orientation;

means for manually displacing the ball away from the second vent hole to prevent the ball from prematurely sealing the second vent hole when the filler neck and cap are in a normal, substantially upright orientation, and wherein said displacing means comprises a plunger disposed above said cover and movable from a retracted position to an extended position and including an axially downwardly extending finger that normally extends through said cover opening and said first central opening to a position outside of said valve body in the retracted position and movable to the extended position where said finger extends into said valve body through said second vent hole to displace said ball from its sealing position in contact with said second vent hole.

2. The cap of claim 1, further comprising a spring to bias said plunger into the normal retracted position.

3. The cap of claim 1 wherein said concentric housing is formed to include at least one additional opening radially displaced from said central opening in said housing.

* * * * *